US012755334B2

(12) United States Patent
Moon et al.

(10) Patent No.: US 12,755,334 B2
(45) Date of Patent: Oct. 6, 2026

(54) NEURAL SUPERSAMPLING METHOD AND DEVICE

(71) Applicant: SAMSUNG ELECTRONICS CO., LTD., Suwon-si (KR)

(72) Inventors: Jaeyoung Moon, Suwon-si (KR); Nahyup Kang, Suwon-si (KR); Minjung Son, Suwon-si (KR); Hyeonseung Yu, Suwon-si (KR); Inwoo Ha, Suwon-si (KR); Seokpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 18/404,438

(22) Filed: Jan. 4, 2024

(65) Prior Publication Data

US 2025/0054100 A1 Feb. 13, 2025

(30) Foreign Application Priority Data

Aug. 10, 2023 (KR) ........................ 10-2023-0105035

(51) Int. Cl.
*G06T 3/40* (2024.01)
*G06T 3/18* (2024.01)
(Continued)

(52) U.S. Cl.
CPC .................. *G06T 3/40* (2013.01); *G06T 3/18* (2024.01); *G06T 5/50* (2013.01); *G06T 7/20* (2013.01);
(Continued)

(58) Field of Classification Search
CPC .... G06T 3/40; G06T 3/18; G06T 5/50; G06T 7/20; G06T 15/00; G06T 2207/20221;
(Continued)

(56) References Cited

U.S. PATENT DOCUMENTS 7,403,208 B1 * 7/2008 Bastos .................... G06T 11/10
345/613
10,783,611 B2 9/2020 Vemulapalli et al.
(Continued)

FOREIGN PATENT DOCUMENTS

EP 4 369 283 A2 5/2024
KR 10-2024-0068296 A 5/2024

OTHER PUBLICATIONS

Communication dated Sep. 23, 2024, issued by the European Patent Office in counterpart European Application No. 24171486.4.
(Continued)

*Primary Examiner* — Wassim Mahrouka
(74) *Attorney, Agent, or Firm* — Sughrue Mion, PLLC

(57) ABSTRACT

A supersampling method includes generating a current rendered image frame by performing jittered sampling on a three-dimensional (3D) scene, based on sub-pixels of low-resolution pixels for the current rendered image frame; generating a current warped image frame by warping a previous output image frame, based on a motion vector map corresponding to a difference between the current rendered image frame and a previous rendered image frame; generating a current shifted image frame by shifting pixels of the current warped image frame, based on a change in sampling positions based on the jittered sampling; and generating a current output image frame, based on the current rendered image frame and the current shifted image frame.

19 Claims, 11 Drawing Sheets

(51) Int. Cl.
*G06T 5/50* (2006.01)
*G06T 7/20* (2017.01)
*G06T 15/00* (2011.01)

(52) U.S. Cl.
CPC .... *G06T 15/00* (2013.01); *G06T 2207/20221* (2013.01)

(58) Field of Classification Search
CPC ... G06T 3/4069; G06T 3/4046; G06T 15/205; G06T 2207/20084; H04N 21/44012; H04N 21/4666
See application file for complete search history.

(56) References Cited

U.S. PATENT DOCUMENTS

| | | | | |
|---|---|---|---|---|
| 11,367,165 | B2 | 6/2022 | Xiao et al. | |
| 11,487,118 | B2 | 11/2022 | Kempf et al. | |
| 2016/0005344 | A1* | 1/2016 | Stine | G09G 3/2085 345/428 |
| 2019/0206026 | A1* | 7/2019 | Vemulapalli | G06T 3/18 |
| 2021/0073944 | A1 | 3/2021 | Liu et al. | |
| 2021/0356744 | A1 | 11/2021 | Kempf et al. | |
| 2021/0366082 | A1 | 11/2021 | Xiao et al. | |
| 2022/0277421 | A1 | 9/2022 | Xiao et al. | |
| 2023/0057261 | A1 | 2/2023 | Liu et al. | |
| 2023/0148225 | A1* | 5/2023 | Thomas | G06T 15/06 345/428 |
| 2023/0196662 | A1* | 6/2023 | Kaskela | G06N 3/0464 345/611 |

OTHER PUBLICATIONS

Lei Yang et al., "A Survey of Temporal Antialiasing Techniques," Eurographics, vol. 39, No. 2, pp. 607-621, 2020, XP071545890.

Eilif Tandberg Swensen, "Deep Learning Controlled Temporal Upsampling—An Efficient Recurrent Convolutional Neural Network Controlled Architecture for Temporal Upsampling," Master's thesis in Computer Science, Norwegian University of Science and Technology, Jun. 2021, total 91 pages, XP055925189.

* cited by examiner

NEURAL SUPERSAMPLING METHOD AND DEVICE

CROSS-REFERENCE TO RELATED APPLICATIONS

This application claims benefit of priority under 35 U.S.C. § 119 to Korean Patent Application No. 10-2023-0105035, filed on Aug. 10, 2023, in the Korean Intellectual Property Office, the disclosure of which is incorporated by reference herein in its entirety.

BACKGROUND

1. Field

The present disclosure relates generally to image processing, and more particularly, to a supersampling method and device for neural network-based image processing.

2. Description of the Related Art

Three-dimensional (3D) rendering may refer to a field of computer graphics for rendering 3D scenes into two-dimensional (2D) images. For example, 3D rendering may be used in various application fields, such as, but not limited to, a 3D game, virtual reality (VR), an animation, a movie, and the like. A neural network may be trained, based on deep learning, to perform inferences for a desired purpose by mapping input data and output data that may be in a nonlinear relationship to each other. An ability trained to generate such a mapping may be referred to as a learning ability of a neural network. The neural network may be used in a variety of technical fields related to image processing.

SUMMARY

One or more example embodiments of the present disclosure may address at least some of the above problems and/or disadvantages and/or other disadvantages not described above. In addition, the example embodiments of the present disclosure may not be required to overcome the disadvantages described above. For example, an example embodiment may not overcome any of the problems described above.

One or more example embodiments of the present disclosure provide a supersampling method and device for neural network-based image processing.

According to an aspect of the present disclosure, a supersampling method includes generating a current rendered image frame by performing jittered sampling on a three-dimensional (3D) scene, based on sub-pixels of low-resolution pixels for the current rendered image frame; generating a current warped image frame by warping a previous output image frame, based on a motion vector map corresponding to a difference between the current rendered image frame and a previous rendered image frame; generating a current shifted image frame by shifting pixels of the current warped image frame, based on a change in sampling positions based on the jittered sampling; and generating a current output image frame, based on the current rendered image frame and the current shifted image frame.

According to an aspect of the present disclosure, an electronic device includes a memory storing instructions, a processor communicatively coupled to the memory, an output device configured to display a previous output image frame and a current output image frame. The processor is configured to execute the instructions to generate a current rendered image frame by performing jittered sampling on a three-dimensional (3D) scene, based on sub-pixels of low-resolution pixels for the current rendered image frame; generate a current warped image frame by warping the previous output image frame, based on a motion vector map corresponding to a difference between the current rendered image frame and a previous rendered image frame; generate a current shifted image frame by shifting pixels of the current warped image frame, based on a change in sampling positions based on the jittered sampling; and generate the current output image frame, based on the current rendered image frame and the current shifted image frame.

Additional aspects of example embodiments may be set forth in part in the description which follows and, in part, may be apparent from the description, and/or may be learned by practice of the present disclosure.

BRIEF DESCRIPTION OF THE DRAWINGS

The above and/or other aspects, features, and advantages of certain embodiments of the present disclosure may be more apparent from the following description taken in conjunction with reference to the accompanying drawings, in which.

DETAILED DESCRIPTION

Figure 1:
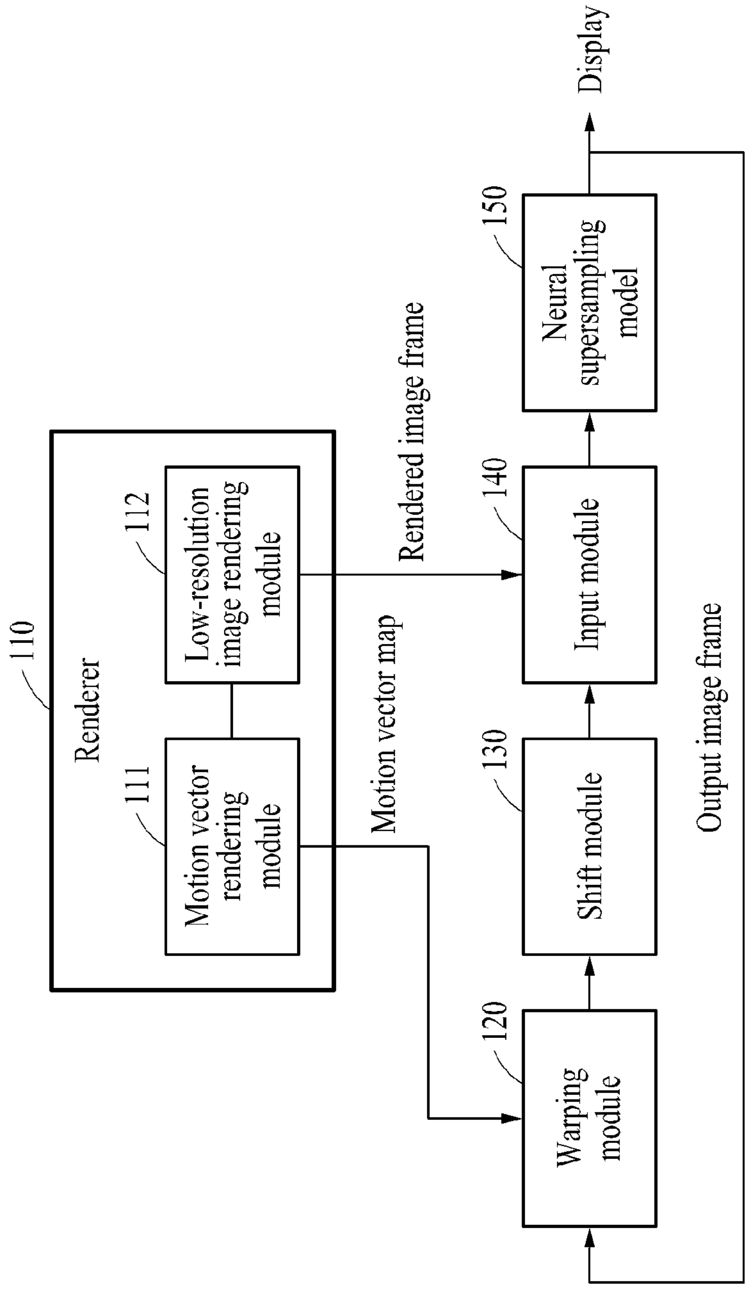
FIG. 1 is a diagram schematically illustrating a neural supersampling process, according to an embodiment.

The following detailed structural and/or functional description is provided as an example only and various alterations and modifications may be made to the examples. Here, the embodiments may not be construed as limiting to the disclosure and should be understood to include all changes, equivalents, and replacements within the idea and the technical scope of the disclosure.

Although terms of "first," "second," and the like may be used to explain various components, the components are not limited to such terms. These terms may only be used to distinguish one component from another component. For example, a first component may be referred to as a second component, or similarly, the second component may be referred to as the first component within the scope of the present disclosure.

It should be noted that if a first component is described as being "connected", "coupled", or "joined" to a second component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It is to be understood that the terms "comprises/comprising" and/or "includes/including" when used herein, specify the presence of stated features, integers, steps, operations, elements, and/or components, but may not preclude the presence or addition of one or more other features, integers, steps, operations, elements, components and/or groups thereof.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

As used herein, "at least one of A and B", "at least one of A, B, or C," and the like, each of which may include any one of the items listed together in the corresponding one of the phrases, or all possible combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, may be interpreted as having a meaning that is consistent with their meaning in the context of the relevant art, and may not to be interpreted in an idealized or overly formal sense unless expressly so defined herein.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, the embodiments are described with reference to the accompanying drawings. When describing an embodiment with reference to the accompanying drawings, like reference numerals may refer to like elements and a repeated description related thereto may be omitted for the sake of brevity.

FIG. 1 is a diagram schematically illustrating a neural supersampling process, according to an embodiment. Referring to FIG. 1, a renderer 110 may include a motion vector rendering module 111 and a low-resolution image rendering module 112. The low-resolution image rendering module 112 may render a three-dimensional (3D) virtual scene into a two-dimensional (2D) image. A 2D image may correspond to a video including a plurality of image frames. A 2D rendered image frame at a current time point may be referred to as a current rendered image frame, and a 2D rendered image frame at a previous time point may be referred to as a previous rendered image frame.

The motion vector rendering module 111 may generate a motion vector map showing a change between rendered image frames in the flow of time. For example, the motion vector rendering module 111 may generate the motion vector map corresponding to a difference between the current rendered image frame and the previous rendered image frame. The motion vector rendering module 111 may generate the motion vector map to exclude an effect of jittered sampling. The jittered sampling is described with reference to FIG. 3.

According to an embodiment, the motion vector rendering module 111 may upscale the motion vector map according to a resolution of an output image frame. For example, the motion vector rendering module 111 may upscale the motion vector map corresponding to the difference between the current rendered image frame and the previous rendered image frame according to a resolution of a previous output image frame.

A warping module 120 may warp an output image frame of a neural supersampling model 150 based on the motion vector map. As used herein, a warping result may refer to a warped image frame. The output image frame may include information corresponding to a next time point according to warping using the motion vector map. For example, when the previous output image frame of the neural supersampling model 150 is warped based on the motion vector map corresponding to the difference between the current rendered image frame and the previous rendered image frame, the previous output image frame may include information corresponding to the current time point. As such, the warping result may be referred to as a current warped image frame.

An input module 140 may generate input data of the neural supersampling model 150 based on processing results of the output image frame of the neural supersampling model 150 by the warping module 120 and a shift module 130, and a rendered image frame output from the low-resolution image rendering module 112. For example, the input module 140 may generate input data by combining (e.g., concatenating) the processing results of the output image frame and the rendered image frame. For example, a space-to-depth conversion may be performed on the processing results. The rendered image frame and a conversion result may be combined to generate the input data. For example, according to the space-to-depth conversion, the processing results may be divided into pixel sets corresponding to a low-resolution image, and the rendered image frame and the pixel sets may be combined to generate the input data. The space-to-depth conversion may be performed using a space-to-depth converting module. The space-to-depth conversion may convert data into a structure suitable for parallel processing.

The neural supersampling model 150 may generate the output image frame by performing supersampling on the input data. For example, the neural supersampling model 150 may generate a next output image frame based on input data including processing results of the current rendered image frame and the previous output image frame.

In an embodiment, upscaling and anti-aliasing may be achieved through the supersampling. The upscaling may refer to an image processing technology for enhancing a resolution, which may also be referred to as super resolution. The aliasing may refer to a phenomenon in which, when a signal is reconstructed from samples, a result may be distorted differently from a continuous form of the original signal.

A neural supersampling model may include a neural network. The neural supersampling model may be trained in advance to generate a high resolution supersampling result from a low-resolution input image.

The neural network may be and/or may include a deep neural network (DNN) including a plurality of layers. The DNN may include at least one of a fully connected network (FCN), a convolutional neural network (CNN), a recurrent neural network (RNN), and the like. For example, at least some of the layers included in the neural network may correspond to the CNN, and others may correspond to the FCN. In an embodiment, the CNN may be referred to as convolutional layers and the FCN may be referred to as fully connected layers. According to an embodiment, the neural supersampling model 150 may include a neural auto-encoder including a neural encoder and a neural decoder.

The neural network may be trained based on deep learning, and may be configured to perform inference for the purpose of training by mapping input data and output data that may be in a nonlinear relationship to each other. Deep learning may refer to a machine learning technique for solving a problem such as, but not limited to, image and/or speech recognition, from a big data set. Deep learning may be construed as an optimization problem solving process of finding a point at which energy may be minimized while training a neural network using prepared training data. Through supervised and/or unsupervised learning of deep learning, a structure of the neural network and/or a weight corresponding to a model may be obtained, and the input data and the output data may be mapped to each other through the weight. If the width and the depth of the neural network are sufficiently large, the neural network may have a capacity sufficient to implement a predetermined function. The neural network may achieve an optimized performance by learning a sufficiently large amount of training data through an appropriate training process.

The low-resolution image rendering module 112 may generate a rendered image frame by performing jittered sampling for a 3D scene based on sub-pixels of low-resolution pixels for the rendered image frame. A low-resolution pixel may refer to a pixel of a low-resolution image, and a high-resolution pixel may refer to a pixel of a high-resolution image. The low-resolution pixel may be divided into a plurality of sub-pixels to have a size corresponding to a high-resolution pixel.

The jittered sampling may refer to a sampling method that may selectively sample sampling points of a 3D scene corresponding to the sub-pixels of each low-resolution pixel. For example, according to the jittered sampling, a sampling point of a 3D scene corresponding to a first sub-pixel of a first low-resolution pixel may be sampled at a first time point, and a sampling point of a 3D scene corresponding to a second sub-pixel of the first low-resolution pixel may be sampled at a second time point. As another example, the selective sampling may include periodic sampling, aperiodic sampling, random sampling, and the like. According to an embodiment, the sampling points may be alternately sampled according to a predetermined period.

The shift module 130 may generate a shifted image frame by shifting pixels of a warped image frame based on a change in sampling position due to the jittered sampling. For example, the shift module 130 may generate a current shifted image frame by shifting pixels of current warped image frames based on a current sampling position of the jittered sampling. The shift module 130 may generate a shifted image frame by shifting pixels of a warped image frame according to a shift pattern synchronized to the change in sampling position due to the jittered sampling. There may be shifting operations corresponding to positions of corresponding sub-pixels of each of low-resolution pixels for the rendered image frame. When one of the sub-pixels is selected as a sampling target according to the jittered sampling, the current shifted image frame may be generated based on a shifting operation corresponding to a position of the sampling target among the shifting operations.

The sampling positions of the sub-pixels used to determine a pixel value of the low-resolution pixels for the rendered image frame may change according to the jittered sampling. In an embodiment, if the shift module 130 is not provided, a processing result (e.g., a warped image frame) based on an output image frame in which the change in sampling position is not reflected may be input to the neural supersampling model 150. In such an embodiment, in order to improve supersampling performance of the neural supersampling model 150, the neural supersampling model 150 may learn such a change in sampling position. The shift module 130 may improve the performance of the neural supersampling model 150 without such learning by adjusting the processing result (e.g., the warped image frame) based on the output image frame according to the change in sampling position.

The renderer 110, the motion vector rendering module 111, the low-resolution image rendering module 112, the warping module 120, the shift module 130, and the input module 140 may be implemented by hardware modules and/or software modules. According to an embodiment, the electronic device (e.g., an electronic device 1100 of FIG. 11) and/or a processor of the electronic device (e.g., a processor 1110 of FIG. 11) may perform supersampling operations according to embodiments by using the renderer 110, the motion vector rendering module 111, the low-resolution image rendering module 112, the warping module 120, the shift module 130, the input module 140, and the neural supersampling model 150. The operations of the renderer 110, the motion vector rendering module 111, the low-resolution image rendering module 112, the warping module 120, the shift module 130, and the input module 140 may be described as operations of the electronic device and/or the processor of the electronic device.

Figure 2:
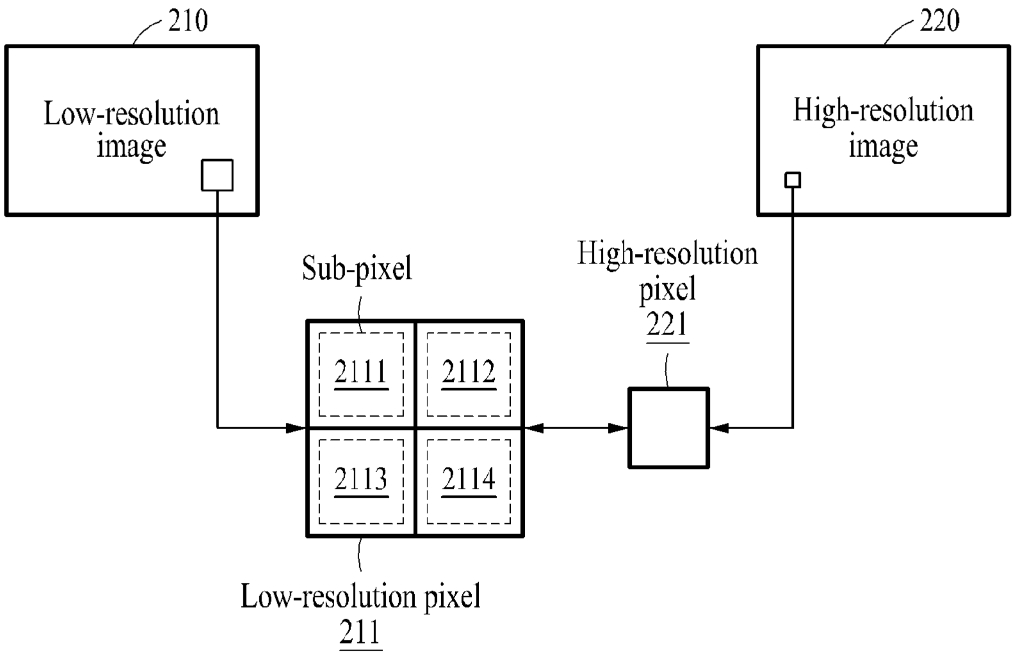
FIG. 2 is a diagram illustrating an example of a relationship between a low-resolution pixel and a high-resolution pixel, according to an embodiment.

FIG. 2 is a diagram illustrating an example of a relationship between a low-resolution pixel and a high-resolution pixel, according to an embodiment. Referring to FIG. 2, a low-resolution pixel 211 of a low-resolution image 210 may include sub-pixels (e.g., first sub-pixel 2111, second sub-pixel 2112, third sub-pixel 2113, and fourth sub-pixel 2114). A size of the first to fourth sub-pixels 2111 to 2114 may correspond to a size of a high-resolution pixel 221 of a high-resolution image 220. A length ratio in a horizontal or vertical direction may be referred to as a scaling factor. For example, the scaling factor in FIG. 2 may be two (2). However, the present disclosure is not limited in this regard, and the scaling factor may be set to another value. A size ratio of an area of the low-resolution pixel 211 to an area of the high-resolution pixel 221 may be proportional to the square of the scaling factor. When the scaling factor is two (2), the size ratio of the area of the low-resolution pixel 211 to the area of the high-resolution pixel 221 may be four (4).

During the rendering process, a 3D scene may be projected onto the low-resolution image 210. For example, points of the 3D scene may be projected onto low-resolution pixels (e.g., the low-resolution pixel 211) of the low-resolution image 210. The points of the 3D scene projected onto the low-resolution pixels may be referred to as sampling points. When selecting a sampling point, centers of the first to fourth sub-pixels 2111 to 2114 may be used instead of a center of the low-resolution pixel 211. Other points may also be used instead of the centers of the first to fourth sub-pixels 2111 to 2114 according to a double period, as described below.

The centers of the first to fourth sub-pixels 2111 to 2114 may be selectively used according to the jittered sampling. For example, a sampling point of the 3D scene corresponding to the first sub-pixel 2111 may be sampled when generating a first rendered image frame, a sampling point of the 3D scene corresponding to the second sub-pixel 2112 may be sampled when generating a second rendered image frame following the first rendered image frame, and a sampling point of the 3D scene corresponding to the third sub-pixel 2113 may be sampled when generating a third rendered image frame following the second rendered image frame. As described above, the jittering in which the sampling points change may be performed with respect to the same low-resolution pixel 211.

Figure 3:
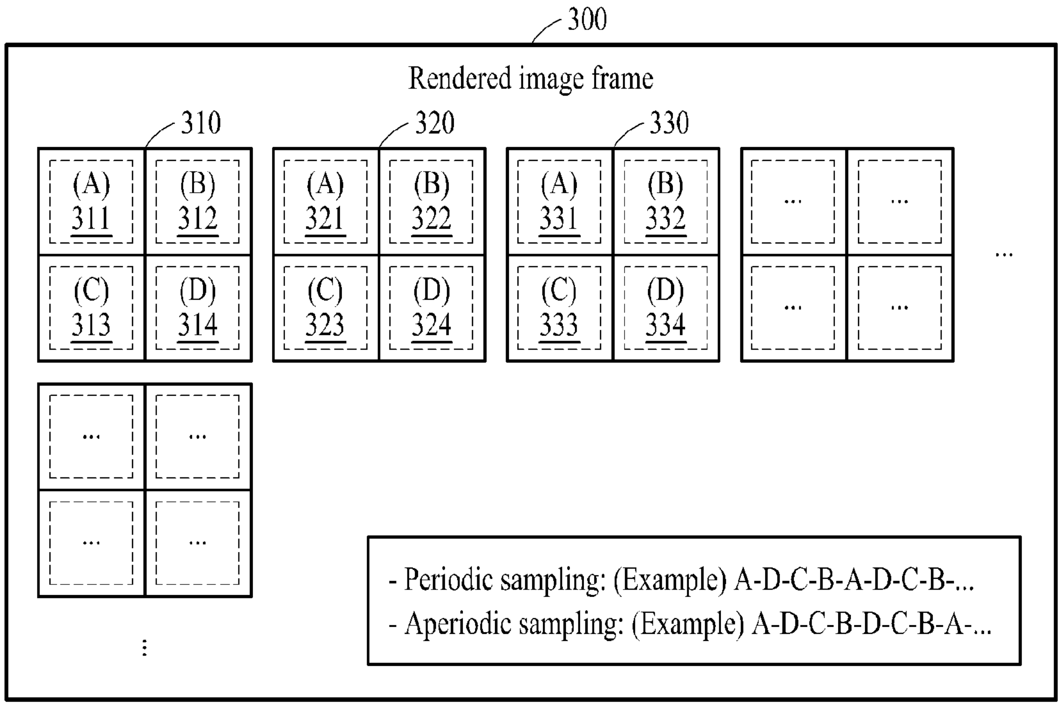
FIG. 3 is a diagram illustrating an example of jittered sampling for sub-pixels of a rendered image frame, according to an embodiment.

FIG. 3 is a diagram illustrating an example of jittered sampling for sub-pixels of a rendered image frame, according to an embodiment. Referring to FIG. 3, a rendered image frame 300 may include low-resolution pixels (e.g., first low-resolution pixel 310, second low-resolution pixel 320, and third low-resolution pixel 330). The first low-resolution pixel 310 may include sub-pixels (e.g., first sub-pixel 311, second sub-pixel 312, third sub-pixel 313, and fourth sub-pixel 314), the second low-resolution pixel 320 may include sub-pixels (e.g., first sub-pixel 321, second sub-pixel 322, third sub-pixel 323, fourth sub-pixel 324), and the third low-resolution pixel 330 may include sub-pixels (e.g., first sub-pixel 331, second sub-pixel 332, third sub-pixel 333, and fourth sub-pixel 334). A sub-pixel belonging to a certain low-resolution pixel may be referred to as a corresponding sub-pixel. For example, the first to fourth sub-pixels 311 to 314 may be referred to as corresponding sub-pixels of the first low-resolution pixel 310, the first to fourth sub-pixels 321 to 324 may be referred to as corresponding sub-pixels of the second low-resolution pixel 320, and the first to fourth sub-pixels 331 to 334 may be referred to as corresponding sub-pixels of the third low-resolution pixel 330. One low-resolution pixel may include a number of sub-pixels, according to a resolution ratio (e.g., four (4) times), between the high-resolution image and the low-resolution image. The resolution ratio may correspond to the square of the scaling factor.

The first to fourth sub-pixels 311 to 314, 321 to 324, and 331 to 334 may be divided according to their positions. For example, the first to fourth sub-pixels 311 to 314, 321 to 324, and 331 to 334 may be divided as a position A, a position B, a position C, and a position D, as shown in FIG. 3. As the sampling position changes according to the jittered sampling, the sampling of the sub-pixels at the corresponding positions may be performed.

According to an embodiment, the sampling points may be alternately sampled according to a predetermined period and according to the jittered sampling. For example, the jittered sampling may be performed in the order of the first sub-pixels 311, 321, and 331 at the position A, the fourth sub-pixels 314, 324, and 334 at the position D, the third sub-pixels 313, 323, and 333 at the position C, the second sub-pixels 312, 322, and 332 at the position B, the first sub-pixels 311, 321, and 331 at the position A, the fourth sub-pixels 314, 324, and 334 at the position D, the third sub-pixels 313, 323, and 333 at the position C, and the second sub-pixels 312, 322, and 332 at the position B, and so on. According to an embodiment, the sampling points may be aperiodically sampled according to the jittered sampling. For example, the jittered sampling may be performed in the order of the first sub-pixels 311, 321, and 331 at the position A, the fourth sub-pixels 314, 324, and 334 at the position D, the third sub-pixels 313, 323, and 333 at the position C, the second sub-pixels 312, 322, and 332 at the position B, the fourth sub-pixels 314, 324, and 334 at the position D, the third sub-pixels 313, 323, and 333 at the position C, the second sub-pixels 312, 322, and 332 at the position B, and the first sub-pixels 311, 321, and 331 at the position A, and so on.

The sampling position according to the periodic sampling may be determined based on frame progress. For example, a frame progress such as i=0, 1, 2, . . . may occur, where i may represent a frame number and be an integer greater than or equal to zero (0). In such an example, the positions A to D may be assigned to frames according to the frame number i. For example, the frame number i may be modulo divided by the number of sub-pixels belonging to each low-resolution pixel (e.g., four (4)), and the positions A to D may be assigned according to the result of the modulo operation. The corresponding result may refer to a resolution ratio between a low-resolution image and a high-resolution image. For example, the position A may be assigned to frames having a frame number i with a modulo result of zero (0) (e.g., i % 4=0), the position D may be assigned to frames having a frame number i with a modulo result of one (1) (e.g., i % 4=1), the position C may be assigned to frames having a frame number i with a modulo result of two (2) (e.g., i % 4=2), and the position B may be assigned to frames having a frame number i with a modulo result of three (3) (e.g., i % 4=3). That is, the sampling of the first sub-pixels 311, 321, and 331 at the position A may be performed in frames with frame numbers i={0, 4, 8, 12, . . . }, the sampling of the fourth sub-pixels 314, 324, and 334 at the position D may be performed in frames with frame numbers i={1, 5, 9, 13, . . . }, the sampling of the third sub-pixels 313, 323, and 333 at the position C may be performed in frames with frame numbers i={2, 6, 10, 14, . . . }, and the sampling of the second sub-pixels 312, 322, and 332 at the position B may be performed in frames with frame numbers i={3, 7, 11, 15, . . . }.

Although FIG. 3 illustrates three (3) low-resolution pixels (e.g., 310 to 330), each having four (4) sub-pixels (e.g., 311 to 314, 321 to 324, and 331 to 334), respectively, it is to be understood that the present disclosure is not limited in this regard. That is, each rendered image frame 300 may contain more (e.g., greater than three (3)) or less (e.g., less than three (3)) low-resolution pixels, and each low-resolution pixel may contain more (e.g., greater than four (4)) or less (e.g., less than four (4)) sub-pixels without departing from the scope of the present disclosure.

Figure 4:
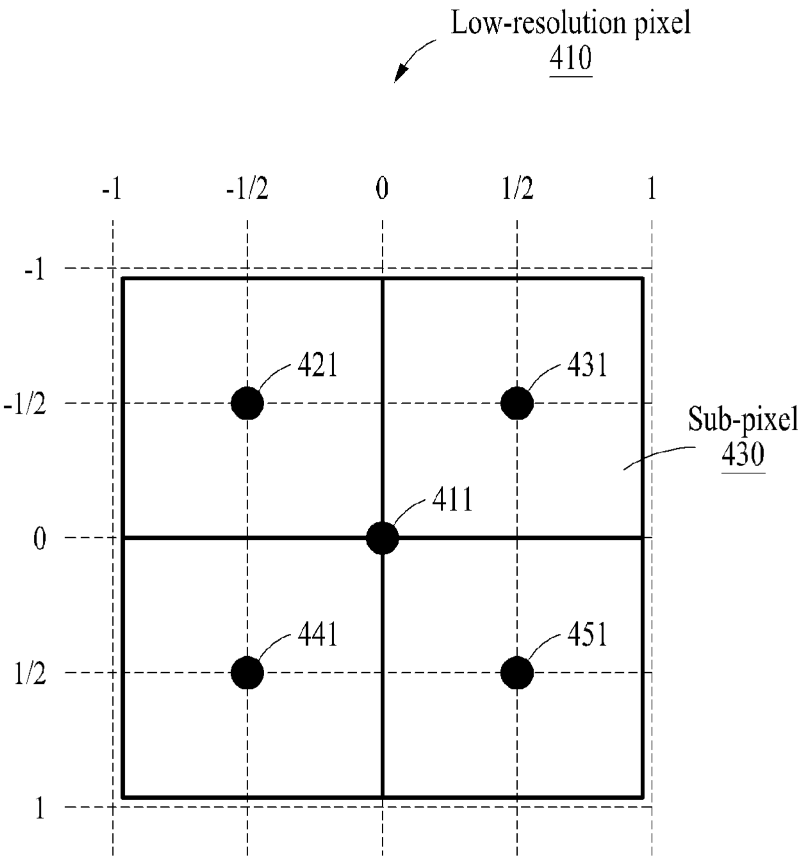
FIG. 4 is a diagram illustrating an example of sampling positions using sub-pixels of a rendered image frame, according to an embodiment.

FIG. 4 is a diagram illustrating an example of sampling positions using sub-pixels of a rendered image frame, according to an embodiment. Referring to FIG. 3, a low-resolution pixel 410 may include sub-pixels (e.g., a sub-pixel 430). According to the jittered sampling, sub-pixel centers (e.g., first sub-pixel center 421, second sub-pixel center 431, third sub-pixel center 441, and fourth sub-pixel center 451) may be used instead of a pixel center 411.

Figure 5:
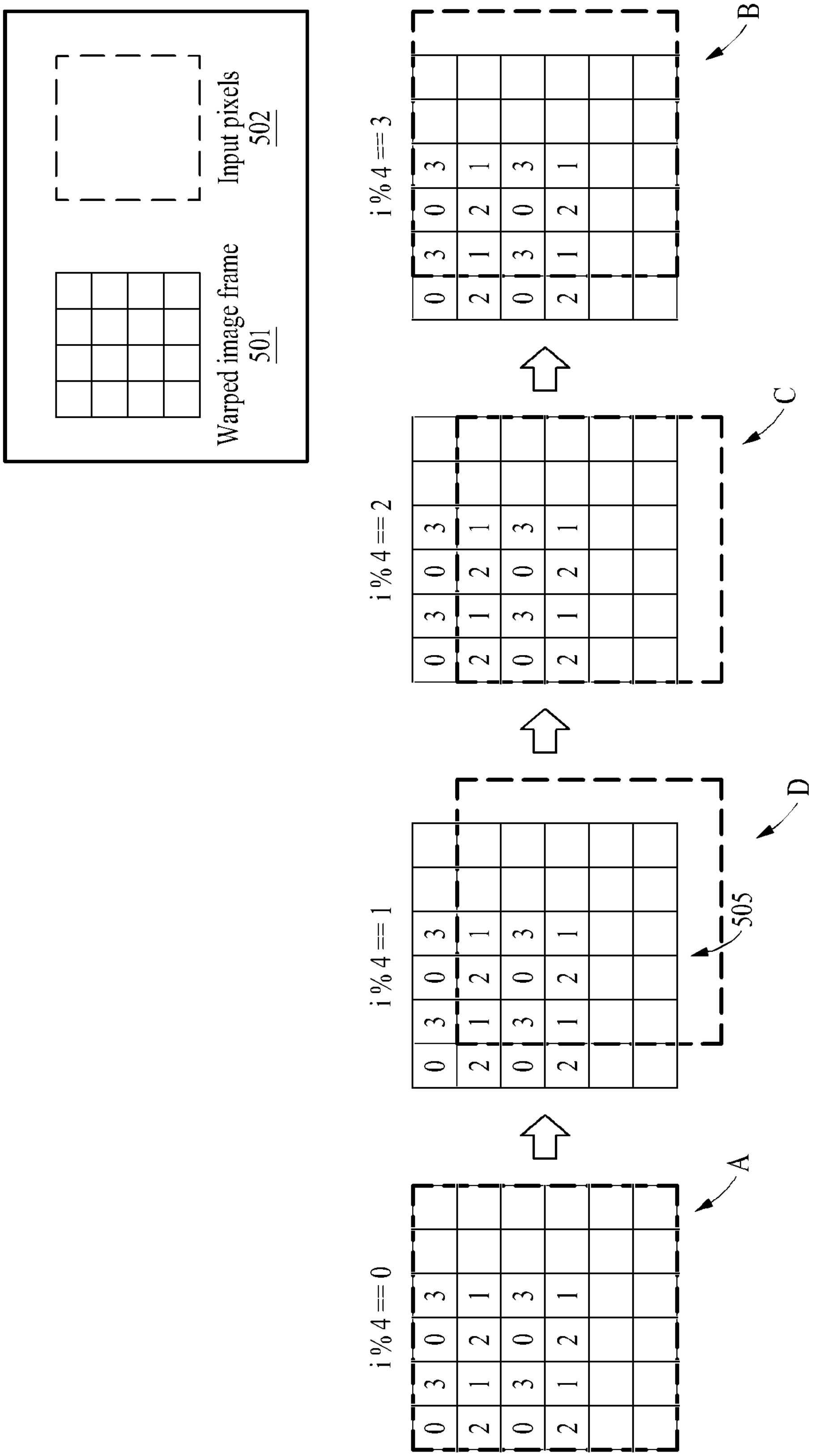
FIG. 5 is a diagram illustrating an example of an operation of generating a shifted image frame in response to jittered sampling, according to an embodiment.

FIG. 5 is a diagram illustrating an example of an operation of generating a shifted image frame in response to jittered sampling, according to an embodiment. Referring to FIG. 5, reference values of 0 to 3 are marked on high-resolution pixels of a warped image frame 501. The high-resolution pixels of the warped image frame 501 may be divided as positions A to D, similar to the sub-pixels of the low-resolution pixels. Unlike the corresponding sub-pixels of one low-resolution pixel being divided as the positions A to D, a plurality of high-resolution pixels corresponding to the corresponding sub-pixels may be divided as the positions A to D. The reference values of 0 to 3 may be assigned to the positions A to D. In a similar manner to the jittered sampling, the reference values of 0 to 3 may refer to a remainder obtained by dividing the frame number i by the number of corresponding sub-pixels belonging to one low-resolution pixel, that is, a resolution ratio between the low-resolution image (e.g., the rendered image frame) and the high-resolution image (e.g., the output image frame).

Input pixels 502 may correspond to a result of a shift operation and form a shifted image frame. According to the jittered sampling, positions where the input pixels 502 are extracted from the warped image frame 501 may be determined according to the positions of the sub-pixels used in the sampling. For example, the positions where the input pixels 502 are extracted from the warped image frame 501 may be determined according to a remainder obtained by dividing the frame number i by the resolution ratio.

As shown in FIG. 5, an example in which the reference value of 0 is assigned to the position A, the reference value of 1 is assigned to the position D, the reference value of 2 is assigned to the position C, and the reference value of 3 is assigned to the position B. In this case, the input pixels 502 may be extracted according to the shift operation based on a position (e.g., one of the positions A to D) having the reference value that is the same as the remainder. For example, when the remainder is 0, the shift operation may be performed to include all the high-resolution pixels at the position A having the reference value of 0, and when the remainder is 1, the shift operation may be performed to include all the high-resolution pixels at the position D having the reference value of 1.

A blank area 505 may be generated due to the shift operation. Pixel values of the blank area 505 may be filled with 0 according to zero padding, filled with adjacent values, or filled according to extrapolation. However, the processing method of the blank area 505 is not limited thereto.

Figure 6:
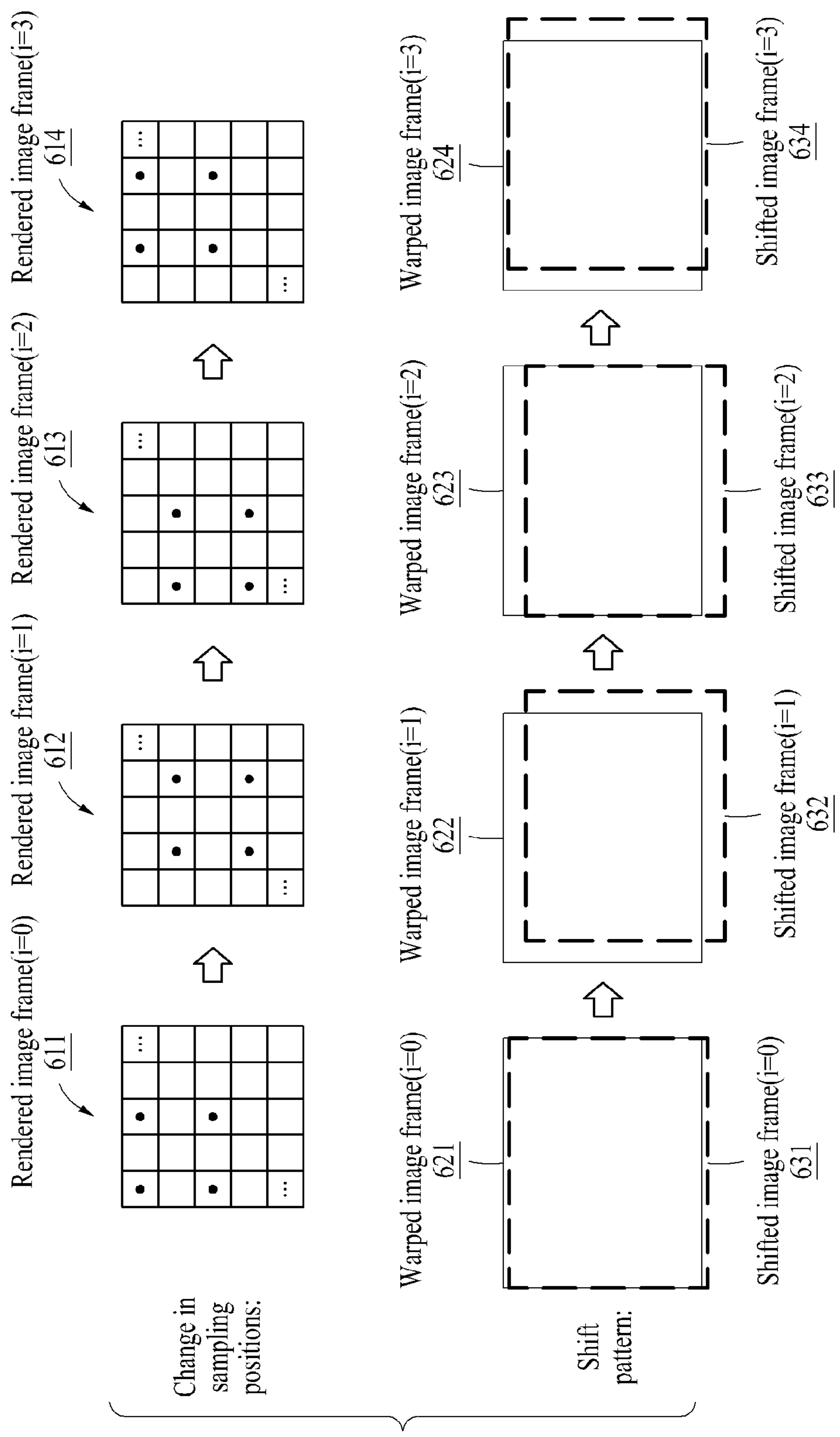
FIG. 6 is a diagram illustrating an example of a relationship between a change in sampling positions and a shift pattern, according to an embodiment.

FIG. 6 is a diagram illustrating an example of a relationship between a change in sampling positions and a shift pattern, according to an embodiment. The change in sampling positions due to the jittered sampling may be synchronized with a shift pattern. Referring to FIG. 6, the sampling positions may be changed in rendered image frames (e.g., first rendered image frame 611, second rendered image frame 612, third rendered image frame 613, and fourth rendered image frame 614) according to the jittered sampling. For example, the sampling of the position A may be performed when the frame number is equal to zero (0) (e.g., i=0), the sampling of the position D may be performed when the frame number is equal to one (1) (e.g., i=1), the sampling of the position C may be performed when the frame number is equal to two (2) (e.g., i=2), and the sampling of the position B may be performed when the frame number is equal to three (3) (e.g., i=3). Accordingly, a shift pattern synchronized to the change in sampling positions may appear. For example, the shift based on the position A may be performed when the frame number is equal to zero (0) (e.g., i=0), the shift based on the position D may be performed when the frame number is equal to one (1) (e.g., i=1), the shift based on the position C may be performed when the frame number is equal to two (2) (e.g., i=2), and the shift based on the position B may be performed when the frame number is equal to three ( ) (e.g., i=3). That is, the shift operation based on the position A may be performed with respect to a first warped image frame 621 when the frame number is equal to zero (0) (e.g., i=0) to determine a first shifted image frame 631, the shift operation based on the position D may be performed with respect to a second warped image frame 622 when the frame number is equal to one (1) (e.g., i=1) to determine a second shifted image frame 632, the shift operation based on the position C may be performed with respect to a third warped image frame 623 when the frame number is equal to two (2) (e.g., i=2) to determine a third shifted image frame 633, and the shift operation based on the position B may be performed with respect to a fourth warped image frame 624 when the frame number is equal to three (3) (e.g., i=3) to determine a fourth shifted image frame 634.

The same frame number as a current rendered image frame may be used for a current warped image frame and a current shifted image frame generated based on a previous output image frame. That is, a motion vector map based on a difference between a rendered image frame of i=j−1 and a rendered image frame of i=j may be applied to an output image frame of i=j−1 to generate a warped image frame of i=j, where i and j are positive integers greater than zero (0). A shifted image frame of i=j may be generated based on the warped image frame of i=j. The shifted image frame of i=j and the rendered image frame of i=j may be composed of input data of i=j of a neural supersampling model. The neural supersampling model may generate an output image frame of i=j based on the input data of i=j.

Figure 7:
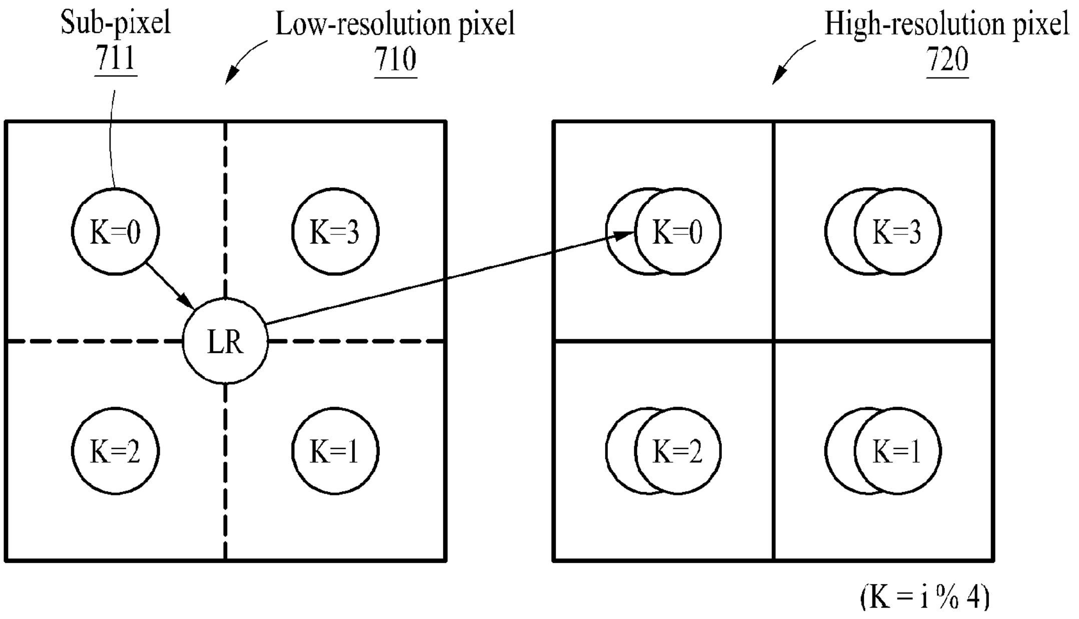
FIG. 7 is a diagram illustrating an example of an operation of performing pixel replacement in response to jittered sampling, according to an embodiment.

FIG. 7 is a diagram illustrating an example of an operation of performing pixel replacement in response to jittered sampling, according to an embodiment. Referring to FIG. 7, a pixel value of a low-resolution pixel 710 may be determined according to jittered sampling using sub-pixels (e.g., a sub-pixel 711) of the low-resolution pixel 710. When K is a remainder obtained by dividing time i by the number of corresponding sub-pixels belonging to one low-resolution pixel (e.g., four (4)), a sampling position based on sub-pixels may be determined according to the value of K, where K is a positive integer greater than or equal to zero (0). For example, the sub-pixel 711 may be used for the sampling when K=0. Other sub-pixels may be used for sampling when K=1 to K=3.

The low-resolution pixel 710 may correspond to a pixel of a rendered image frame, and a high-resolution pixel 720 may correspond to a pixel of a shifted image frame. According to an embodiment, the pixel of the shifted image frame may be replaced with the pixel of the rendered image frame in response to the jittered sampling. That is, target pixels corresponding to the sampling position of the jittered sampling may be selected in the shifted image frame. Pixels of the shifted image frame may be classified based on positions of pixels, similarly to the sub-pixels of the rendered image frame. For example, the pixels of the shifted image frame may be classified according to the remainder of K=0 to K=3, similarly to the sub-pixels of the rendered image frame. When sub-pixels at corresponding positions of low-resolution pixels are selected according to the jittered sampling in the rendered image frame, high-resolution pixels having corresponding positions to the corresponding sub-pixels may be selected in the shifted image frame as target pixels. When the target pixels are selected in the shifted image frame, the target pixels may be replaced with the low-resolution pixels in the rendered image frame.

The rendered image frame may correspond to current image information, and the shifted image frame may correspond to a warping result of previous image information. The shifted image frame may also have the characteristics of the current image information through the warping, but may not sufficiently reflect the current image information compared to the rendered image frame corresponding to the actual current image information. The current image information may be additionally reflected in the shifted image frame through the pixel replacement.

Figure 8:
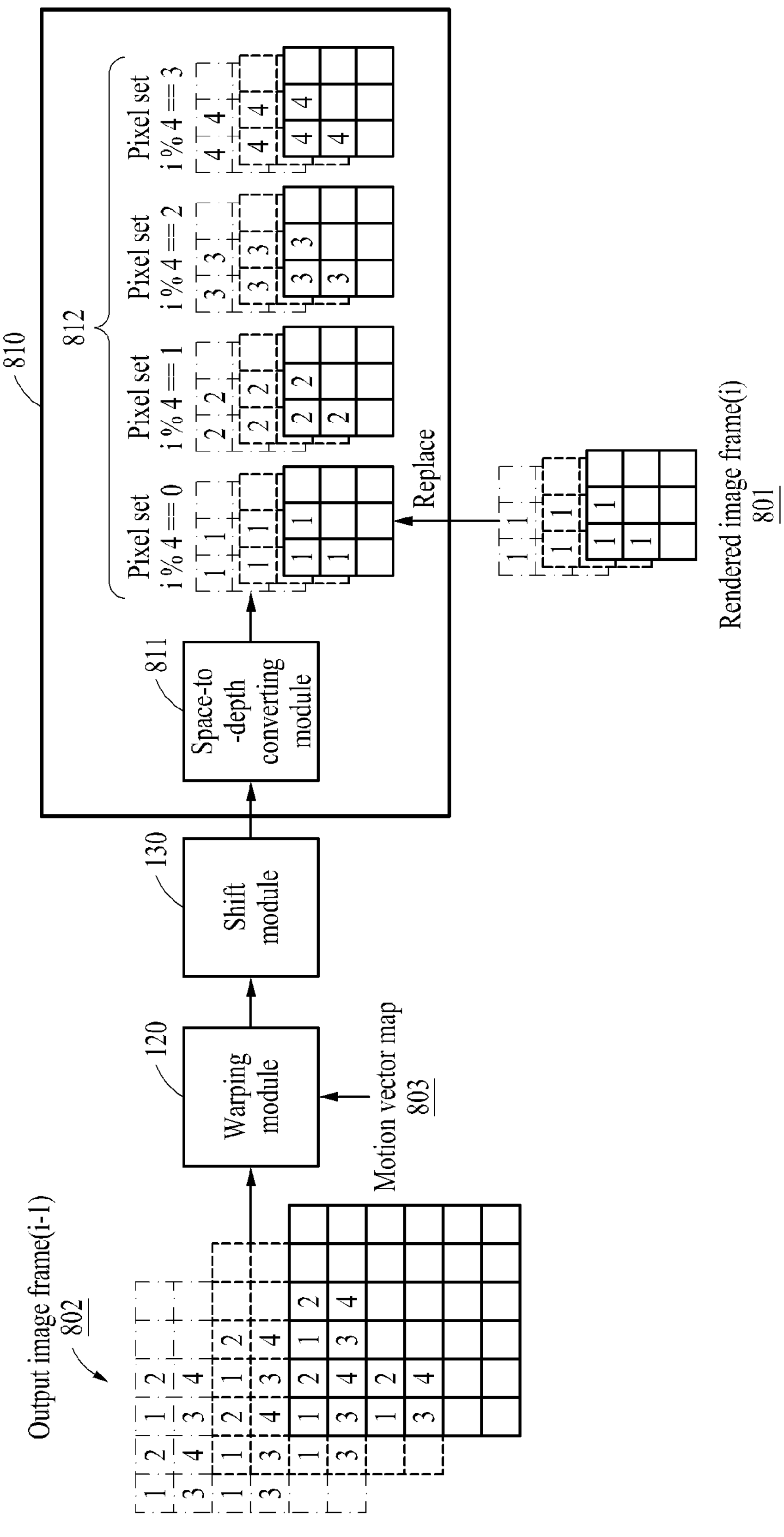
FIG. 8 is a diagram illustrating an example of an operation of pixel replacement using pixel sets, according to an embodiment.

FIG. 8 is a diagram illustrating an example of an operation of pixel replacement using pixel sets, according to an embodiment. Referring to FIG. 8, the warping module 120 may generate a warped image frame based on an output image frame 802 and a motion vector map 803, and the shift module 130 may generate a shifted image frame based on the warped image frame.

A space-to-depth converting module 811 may perform sub-sampling corresponding to jittered sampling to divide the shifted image frame into pixel sets 812 each corresponding to a low-resolution image. The shifted image frame may be classified into the pixel sets 812 according to a remainder obtained by dividing a frame number by a resolution ratio. A pixel replacement module 810 may set pixels of one of the pixel sets 812 as target pixels for pixel replacement. A pixel set corresponding to sub-pixels according to the jittered sampling may be selected. The pixel replacement module 810 may replace the target pixels with pixels of a rendered image frame 801.

As shown in FIG. 8, the rendered image frame 801, the output image frame 802, and the pixel sets 812 may be processed in a state of being classified into a plurality of channels (e.g., red-green-blue (RGB) channels). That is, FIG. 8 shows an example in which the rendered image frame 801, the output image frame 802, and the pixel sets 812 are classified into three (3) channels. The output image frame 802 may correspond to a (i−1)-th frame. A warped image frame, a shifted image frame, and the rendered image frame 801 may correspond to an i-th frame.

The description provided with reference to FIG. 7 may be additionally applied to the pixel replacement. The description provided with reference to FIG. 1 may be additionally applied to the warping module 120 and the shift module 130. The pixel replacement module 810 and the space-to-depth converting module 811 may be implemented by hardware modules and/or software modules. According to an embodiment, an electronic device (e.g., electronic device 1100 of FIG. 11) and/or a processor of the electronic device (e.g., processor 1110 of FIG. 11) may perform supersampling operations according to embodiments by using the pixel replacement module 810 and the space-to-depth converting module 811. The operations of the pixel replacement module 810 and the space-to-depth converting module 811 may be described as operations of the electronic device and/or the processor of the electronic device.

Figure 9:
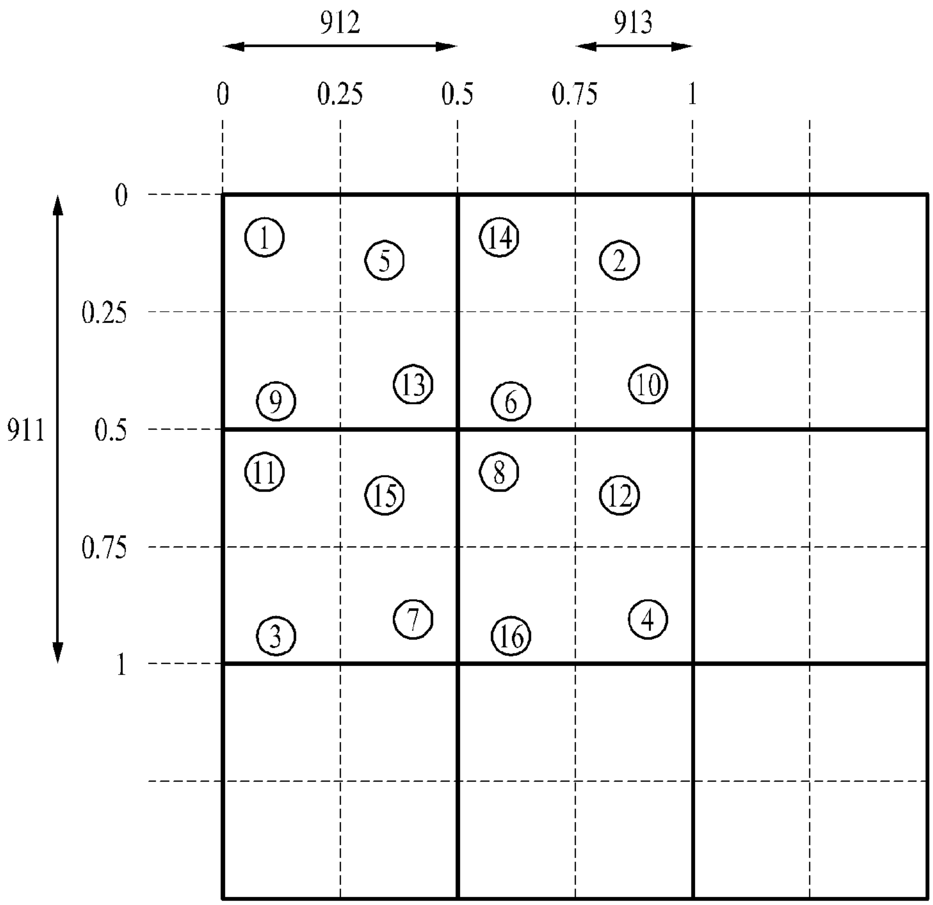
FIG. 9 is a diagram illustrating an example of a jittered sampling process using a double period, according to an embodiment.

FIG. 9 is a diagram illustrating an example of a jittered sampling process using a double period, according to an embodiment. Referring to FIG. 9, a sub-pixel area 912 of a low-resolution pixel area 911 may be divided into secondary sub-pixel areas 913. Secondary sub-pixels belonging to a certain sub-pixel may be referred to as corresponding secondary sub-pixels. One sub-pixel may include a number of corresponding secondary sub-pixels according to a resolution ratio (e.g., four (4) times) between a high-resolution image and a low-resolution image. The jittered sampling of a double period using the secondary sub-pixels corresponding to the secondary sub-pixel area 913 may be performed. FIG. 9 shows an example of first to sixteenth sampling points based on a double period.

That is, corresponding sub-pixels to each low-resolution pixel of a rendered image frame may be alternately selected according to a first period. When the positions A to D described above with reference to FIG. 3 are used for the description, FIG. 9 shows an example in which sub-pixels are selected in the order of A-B-C-D according to the first period.

In an embodiment, sampling points of a 3D scene corresponding to the corresponding secondary sub-pixels of each of the selected sub-pixels may be alternately sampled according to a second period. Accordingly, the entire period may correspond to the product of the first period and the second period. A certain sub-pixel may be selected in every first period, and a corresponding secondary sub-pixel of the corresponding sub-pixel may be selected in every first period×second period. The shift operation may be synchronized to the first period.

According to an embodiment, the secondary sub-pixels may be selected according to various sequence algorithms (e.g., Hammersley sequence and Halton sequence) in a sub-pixel area based on the second period. When such a sequence algorithm is used in the entire sub-pixel area, sampling biased toward one sub-pixel area may be performed. When such a sequence algorithm is used in the double period, the balanced sampling may be performed in the entire sub-pixel area.

Figure 10:
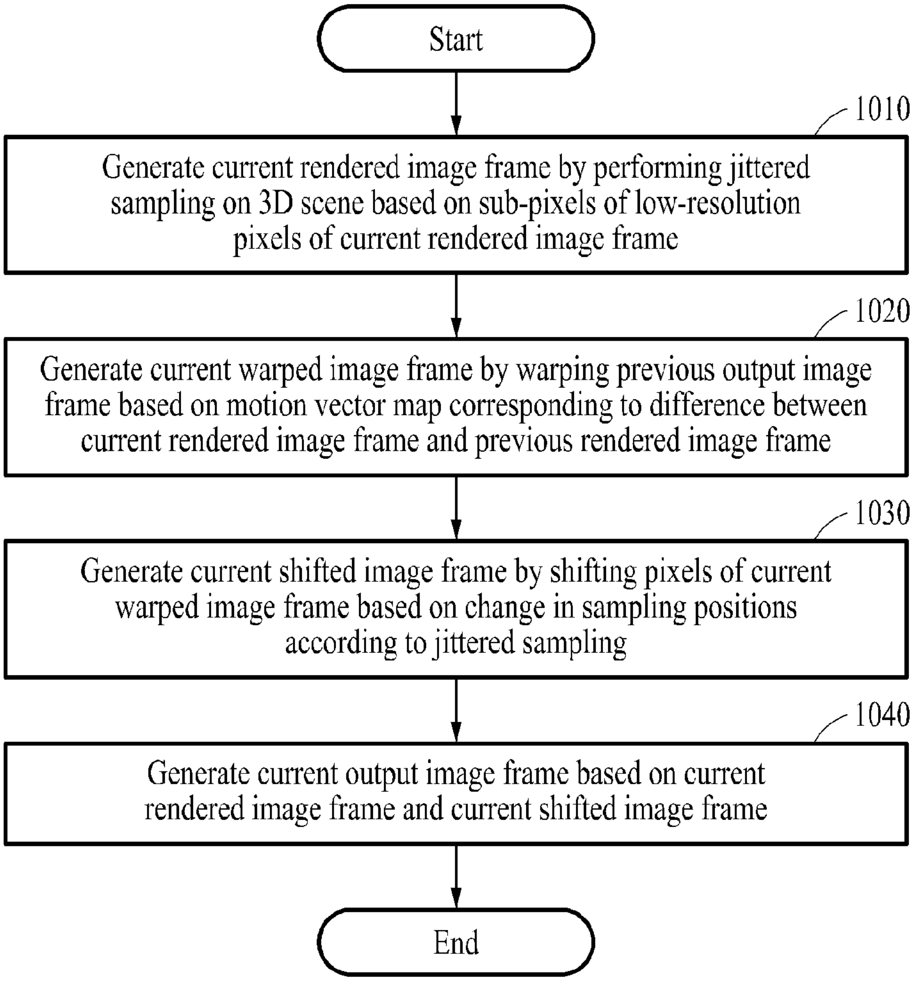
FIG. 10 is a flowchart illustrating a neural supersampling method, according to an embodiment.

FIG. 10 is a flowchart illustrating a neural supersampling method, according to an embodiment. According to an embodiment, an electronic device (e.g., electronic device 1100 of FIG. 11) generates a current rendered image frame by performing jittered sampling on a 3D scene based on sub-pixels of low-resolution pixels for the current rendered image frame in operation 1010, generates a current warped image frame by warping a previous output image frame of a neural supersampling model based on a motion vector map corresponding to a difference between the current rendered image frame and a previous rendered image frame in operation 1020, generates a current shifted image frame by shifting pixels of the current warped image frame based on a change in sampling positions according to the jittered sampling in operation 1030, and generates a current output image frame based on the current rendered image frame and the current shifted image frame in operation 1040.

Operation 1010 may include performing the jittered sampling by selectively sampling sampling points of the 3D scene corresponding to corresponding sub-pixels of each of the low-resolution pixels for the current rendered image frame.

The sampling points may be alternately sampled according to a predetermined period.

Operation 1030 may include generating the current shifted image frame by shifting pixels of the current warped image frame according to a shift pattern synchronized to the change in sampling positions according to the jittered sampling.

There are shift operations corresponding to positions of corresponding sub-pixels of each of the low-resolution pixels for the current rendered image frame, and when one of the sub-pixels is selected as a sampling target according to the jittered sampling, the current shifted image frame may be generated based on a shift operation corresponding to a position of the sampling target among the shift operations.

Operation 1010 may include alternately selecting corresponding sub-pixels of each of the low-resolution pixels for the current rendered image frame according to a first period, and alternately sampling sampling points of the 3D scene corresponding to corresponding secondary sub-pixels of each of the selected sub-pixels according to a second period.

The previous output image frame and the current output image frame may be generated by a neural network-based neural supersampling model.

Operation 1040 may include generating input data by combining the current rendered image frame and the current shifted image frame, and generating the current output image frame by inputting the input data into the neural supersampling model.

The generating of the input data may include dividing the shifted image frame into pixel sets corresponding to a low-resolution image by performing sub-sampling corresponding to the jittered sampling, and generating the input data by combining the current rendered image frame and the pixel sets.

The electronic device may select target pixels corresponding to the sampling positions of the jittered sampling in the shifted image frame, and replace the target pixels with pixels of the current rendered image frame.

The selecting of the target pixels may include dividing the shifted image frame into pixel sets corresponding to a low-resolution image by performing sub-sampling corresponding to the jittered sampling, and setting pixels of one of the pixel sets as target pixels.

The sub-pixels of the low-resolution pixels for the current rendered image frame may have sizes corresponding to high-resolution pixels, the previous rendered image frame and the current rendered image frame may correspond to a low-resolution image based on the low-resolution pixels, and the previous output image frame and the previous output image frame may correspond to a high-resolution image based on the high-resolution pixels.

The electronic device may upscale the motion vector map corresponding to the difference between the current rendered image frame and the previous rendered image frame according to a resolution of the previous output image frame.

The neural supersampling model may include a neural network.

In addition, the descriptions provided with reference to FIGS. 1 to 9 and FIG. 11 may apply to the neural supersampling method of FIG. 10.

Figure 11:
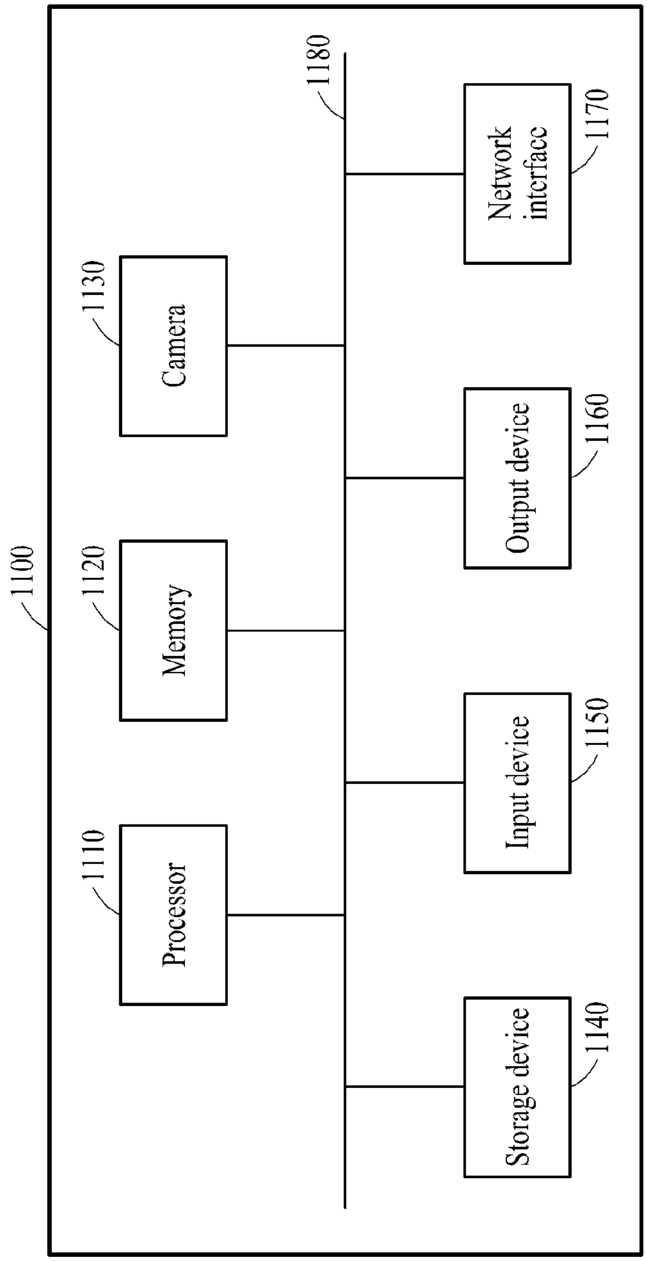
FIG. 11 is a diagram illustrating an example of a configuration of an electronic device, according to an embodiment.

FIG. 11 illustrates an example of a configuration of an electronic device, according to an embodiment. Referring to FIG. 11, an electronic device 1100 may include a processor 1110, a memory 1120, a camera 1130, a storage device 1140, an input device 1150, an output device 1160, and a network interface 1170 that may communicate with each other through a communication bus 1180. For example, the electronic device 1100 may be implemented as at least a portion of, for example, a mobile device such as a mobile phone, a smartphone, a personal digital assistant (PDA), a netbook, a tablet computer, a laptop computer, and the like, a wearable device such as a smart watch, a smart band, smart glasses, and the like, a computing device such as a desktop, a server, and the like, a game machine such as a game console, a portable game machine, a wearable game machine, and the like, a home appliance such as a television (TV), a smart TV, a refrigerator, and the like, a security device such as a door lock, a vehicle such as an autonomous vehicle, a smart vehicle, and the like.

The processor 1110 may execute functions and instructions to be executed in the electronic device 1100. For example, the processor 1110 may process the instructions stored in the memory 1120 and/or the storage device 1140. The processor 1110 may perform the operations described with reference to FIGS. 1 to 10. For example, the processor 1110 may generate a current rendered image frame by performing jittered sampling on a 3D scene based on sub-pixels of low-resolution pixels for the current rendered image frame, generate a current warped image frame by warping a previous output image frame of a neural supersampling model based on a motion vector map corresponding to a difference between the current rendered image frame and a previous rendered image frame, generate a current shifted image frame by shifting pixels of the current warped image frame based on a change in sampling positions according to the jittered sampling, and generate a current output image frame by executing the neural supersampling model based on the current rendered image frame and the current shifted image frame.

The memory 1120 may include a computer-readable storage medium and/or a computer-readable storage device. The memory 1120 may store instructions to be executed by the processor 1110 and may store related information while software and/or an application is executed by the electronic device 1100.

The camera 1130 may capture a photo and/or a video. The storage device 1140 includes a computer-readable storage medium and/or computer-readable storage device. The storage device 1140 may store a more quantity of information than the memory 1120 for a long time. For example, the storage device 1140 may be and/or may include a magnetic hard disk, an optical disc, a flash memory, a floppy disk, and/or other non-volatile memories.

The input device 1150 may receive an input from the user in conventional input manners through a keyboard and a mouse, and/or in other input manners such as, but not limited to, a touch input, a voice input, and an image input. For example, the input device 1150 may include a keyboard, a mouse, a touch screen, a microphone, or any other device that detects the input from the user and transmits the detected input to the electronic device 1100. The output device 1160 may provide a user with an output of the electronic device 1100 through a visual channel, an auditory channel, or a tactile channel. The output device 1160 may include, for example, a display, a touch screen, a speaker, a vibration generator, or any other device that provides an output to a user. For example, the output device 1160 may display output image frames including a previous output image frame and a current output image frame. The network interface 1170 may communicate with an external device through a wired and/or wireless network.

The embodiments described herein may be implemented using a hardware component, a software component, and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular. However, it is to be understood that a processing device may include multiple processing elements and multiple types of processing elements. For example, the processing device may include a plurality of processors, or a single processor and a single controller. In addition, different processing configurations may be implemented, such as, but not limited to, parallel processors. When a processor is described as carrying out an operation and the processor is referred to perform an additional operation, the multiple operations may be executed by either a single processor or any one or a combination of multiple processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software may also be distributed over network-coupled computer systems so that the software is stored and executed in a distributed fashion. The software and data may be stored by one or more non-transitory computer-readable recording mediums.

The methods according to the examples may be recorded in non-transitory computer-readable media including program instructions to implement various operations of the examples. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include, but are not limited to, magnetic media such as hard disks, floppy disks, and magnetic tape: optical media such as, but not limited to, compact disc-read-only memory (CD-ROM) discs and digital video discs (DVDs); magneto-optical media such as, but not limited to, optical discs; and hardware devices that are specially configured to store and perform program instructions, such as read-only memory (ROM), random access memory (RAM), flash memory, and the like. Examples of program instructions include, but are not limited to, both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A supersampling method, comprising:

generating a current rendered image frame by performing jittered sampling on a three-dimensional (3D) scene, based on sub-pixels of low-resolution pixels for the current rendered image frame;

generating a current warped image frame by warping a previous output image frame, based on a motion vector map corresponding to a difference between the current rendered image frame and a previous rendered image frame;

generating a current shifted image frame by shifting pixels of the current warped image frame, based on a change in sampling positions based on the jittered sampling; and generating a current output image frame, based on the current rendered image frame and the current shifted image frame;

selecting target pixels in the current shifted image frame based on the sampling positions of the jittered sampling; and replacing the target pixels with pixels of the current rendered image frame.

2. The supersampling method of claim 1, wherein the generating of the current rendered image frame comprises:

performing the jittered sampling by selectively sampling a plurality of sampling points of the 3D scene corresponding to corresponding sub-pixels of each of the low-resolution pixels for the current rendered image frame.

3. The supersampling method of claim 2, further comprising:

alternately sampling the plurality of sampling points, based on a predetermined period.

4. The supersampling method of claim 1, wherein the generating of the current shifted image frame comprises:

shifting the pixels of the current warped image frame based on a shift pattern synchronized to the change in the sampling positions based on the jittered sampling.

5. The supersampling method of claim 1, wherein a plurality of shift operations corresponds to positions of the sub-pixels of each of the low-resolution pixels for the current rendered image frame, and wherein the generating of the current shifted image frame comprises:

selecting, based on the jittered sampling, a sampling target from among the sub-pixels of each of the low-resolution pixels for the current rendered image frame; and generating the current shifted image frame based on a shift operation from among the plurality of shift operations corresponding to a position of the sampling target.

6. A supersampling method, comprising:

generating a current rendered image frame by performing jittered sampling on a three-dimensional (3D) scene, based on sub-pixels of low-resolution pixels for the current rendered image frame;

generating a current warped image frame by warping a previous output image frame, based on a motion vector map corresponding to a difference between the current rendered image frame and a previous rendered image frame;

generating a current shifted image frame by shifting pixels of the current warped image frame, based on a change in sampling positions based on the jittered sampling; and generating a current output image frame, based on the current rendered image frame and the current shifted image frame by:

alternately selecting corresponding sub-pixels of each of the low-resolution pixels for the current rendered image frame, based on a first period; and alternately sampling sampling points of the 3D scene corresponding to corresponding secondary sub-pixels of each of the selected corresponding sub-pixels, based on a second period.

7. The supersampling method of claim 1, wherein the supersampling method further comprises generating, using a neural network-based neural supersampling model, the previous output image frame, and wherein the generating of the current output image frame comprises generating, using the neural network-based neural supersampling model, the current output image frame.

8. The supersampling method of claim 1, wherein the generating of the current output image frame comprises:

generating input data by combining the current rendered image frame and the current shifted image frame; and inputting the input data into a neural network-based neural supersampling model.

9. The supersampling method of claim 8, wherein the generating of the input data comprises:

dividing the current shifted image frame into pixel sets corresponding to a low-resolution image by performing sub-sampling based on the jittered sampling; and combining the current rendered image frame and the pixel sets.

10. The supersampling method of claim 1, wherein the selecting of the target pixels comprises:

dividing the current shifted image frame into pixel sets corresponding to a low-resolution image by performing sub-sampling based on the jittered sampling; and setting pixels of one of the pixel sets as thee target pixels.

11. The supersampling method of claim 1, wherein the sub-pixels of the low-resolution pixels for the current rendered image frame have sizes corresponding to high-resolution pixels, wherein the previous rendered image frame and the current rendered image frame correspond to a low-resolution image based on the low-resolution pixels, and wherein the previous output image frame and the previous output image frame correspond to a high-resolution image based on the high-resolution pixels.

12. The supersampling method of claim 1, further comprising:

upscaling the motion vector map corresponding to the difference between the current rendered image frame and the previous rendered image frame, based on a resolution of the previous output image frame.

13. A non-transitory computer-readable storage medium storing instructions that, when executed by a processor, cause the processor to perform the supersampling method of claim 1.

14. An electronic device, comprising:

a memory storing instructions; and a processor communicatively coupled to the memory, wherein the processor is configured to execute the instructions to:

generate a current rendered image frame by performing jittered sampling on a three-dimensional (3D) scene, based on sub-pixels of low-resolution pixels for the current rendered image frame;

generate a current warped image frame by warping a previous output image frame, based on a motion vector map corresponding to a difference between the current rendered image frame and a previous rendered image frame;

generate a current shifted image frame by shifting pixels of the current warped image frame, based on a change in sampling positions based on the jittered sampling; and generate a current output image frame, based on the current rendered image frame and the current shifted image frame;

select target pixels in the current shifted image frame based on the sampling positions of the jittered sampling; and replace the target pixels with pixels of the current rendered image frame; and an output device configured to display the previous output image frame and the current output image frame.

15. The electronic device of claim 14, wherein the processor is further configured to execute the instructions to:

selectively sample a plurality of sampling points of the 3D scene corresponding to corresponding sub-pixels of each of the low-resolution pixels for the current rendered image frame.

16. The electronic device of claim 15, wherein the processor is further configured to execute the instructions to:

alternately sample the plurality of sampling points, based on a predetermined period.

17. The electronic device of claim 14, wherein the processor is further configured to execute the instructions to:

shift the pixels of the current warped image frame, based on a shift pattern synchronized to the change in the sampling positions based on the jittered sampling.

18. The electronic device of claim 14, wherein a plurality of shift operations corresponds to positions of the sub-pixels of each of the low-resolution pixels of the current rendered image frame, and wherein the processor is further configured to execute the instructions to:

select, based on the jittered sampling, a sampling target from among the sub-pixels of each of the low-resolution pixels for the current rendered image frame; and generate the current shifted image frame based on a shift operation from among the plurality of shift operations corresponding to a position of the sampling target.

19. The electronic device of claim 14, wherein the processor is further configured to execute the instructions to:

alternately select corresponding sub-pixels of each of the low-resolution pixels for the current rendered image frame, based on a first period; and alternately sample sampling points of the 3D scene corresponding to corresponding secondary sub-pixels of each of the selected corresponding sub-pixels, based on a second period.

* * * * *